Oct. 5, 1971

G. J. CARLSON 3,610,029

VIBRATION TRANSDUCER FOR ROTATING SHAFT
USING A DIFFERENTIAL TRANSFORMER

Filed Jan. 8, 1969

Inventor:
Gerald J. Carlson,
by Louis A. Moncha

Inventor:
Gerald J. Carlson,
by Louis A. Moucha

United States Patent Office 3,610,029
Patented Oct. 5, 1971

3,610,029
VIBRATION TRANSDUCER FOR ROTATING SHAFT USING A DIFFERENTIAL TRANSFORMER
Gerald J. Carlson, Scotia, N.Y., assignor to General Electric Company
Filed Jan. 8, 1969, Ser. No. 789,900
Int. Cl. G01h *11/00;* H04r *29/00*
U.S. Cl. 73—71.4        5 Claims

ABSTRACT OF THE DISCLOSURE

A vibration transducer for sensing vibration of a rotating shaft includes a special differential transformer and electronic circuitry connected across the transformer secondary windings for developing a voltage proportional to a characteristic of the vibration such as displacement amplitude, velocity and acceleration. The differential transformer includes an annular core of high permeability material rigidly fastened on the shaft subject to vibration, and the primary and secondary windings are arranged in an annular coil form mounted on a fixed support. The annular coil form is positioned around the core forming a small air gap therebetween, and the core is displaced relative to the coil form in response to vibration of the shaft. An alternating-current (A.C.) excitation voltage of constant frequency is applied across the primary winding to induce alternating voltages of the same frequency in the secondary windings. The electronic circuit filters out the excitation frequency component voltage and processes the remaining vibration frequency component voltage signal.

---

My invention relates to a transducer for sensing the vibration of a rotating shaft, and in particular, to a transducer employing a special differential transformer as the sensing element wherein the core of the transformer is of annular shape and rigidly fastened on the rotating shaft.

Vibration transducers find utility in the sensing of vibrations of rotating shafts and the like, and as one example find application in machine tool control for sensing and measuring the vibration of rotating tools such as drills and milling cutters. The signals generated by the vibration transducer may then be utilized in an adaptive feedback control system for automating the machine tool operation.

Prior art vibration transducers for rotating shafts have utilized sensing devices which are in mechanical contact with the rotating shaft and thereby are generally subject to a short lifetime since they also undergo the shaft vibration. Others require active components mounted on the shaft or slip rings. Thus, there is a need for a vibration transducer which is mechanically isolated from the vibrating body to thereby provide reliable operation over a long period of time.

Therefore, one of the principal objects of my invention is to provide a vibration transducer having a sensing portion mechanically isolated from a rotating shaft subject to vibration.

Another object of my invention is to provide a differential transformer of special design as the sensing portion of the transducer wherein the windings are mechanically isolated from the rotating shaft.

A still further object of my invention is to rigidly fasten an annular core of the differential transformer on the rotating shaft.

Briefly stated, and in accordance with my invention, I provide a differential transformer as the sensing element of my vibration transducer. The primary and secondary windings are arranged in an annular coil form mounted around and stationary relative to a rotatable shaft subject to vibration. An annular, high permeability magnetic core is rigidly fastened on the shaft and positioned such that the annular coil form surrounds the core in spaced apart relationship forming a small air gap therebetween whereby the windings are in flux linkage relationship with the core. The rotating shaft passes completely through the annular coil form, and the longitudinal axes of the annular core and annular coil form are coincident whereby the annular core is displaced relative to the annular coil form in response to vibration of the shaft. An A.C. excitation voltage at a selected frequency is impressed across the primary winding and electronic circuit means are in communication with the secondary windings for developing a voltage signal of magnitude proportional to the amplitude of shaft vibration displacement. Additional electronic circuitry may be utilized for converting the vibration displacement signal to vibration velocity and acceleration signals, as desired.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same character reference and wherein:

Figure 3A:
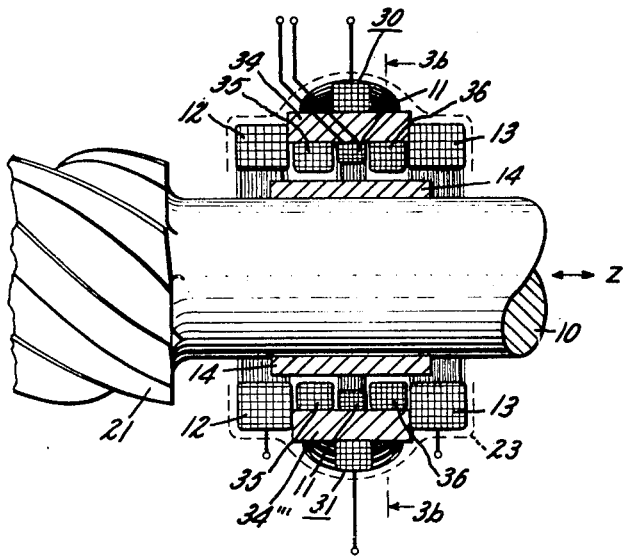
Figure 3B:
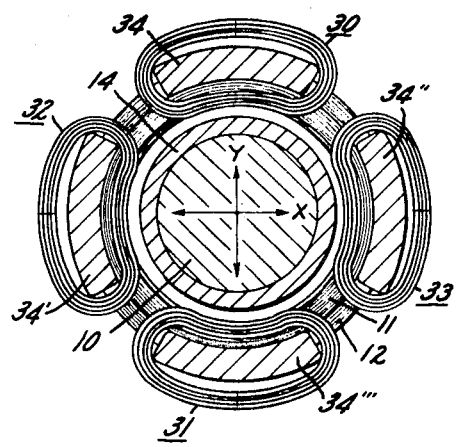
Figure 3C:
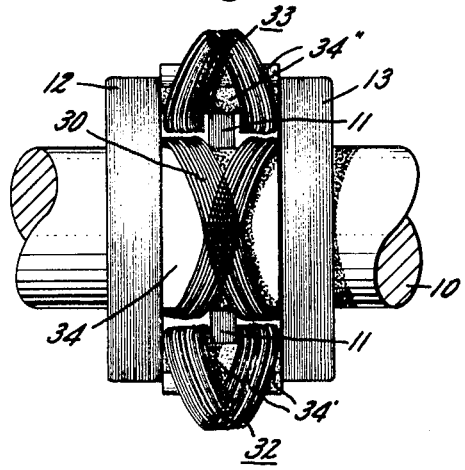
Figure 3D:
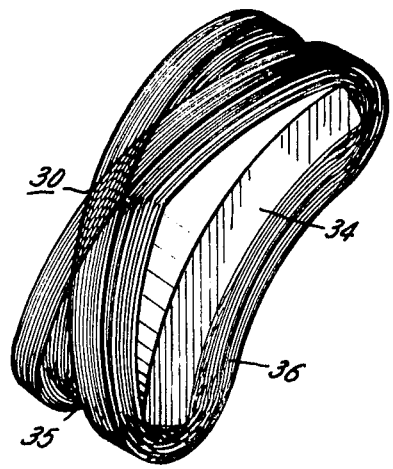

FIGS. 3a, 3b and 3c illustrate an elevation view, partly in section, a sectional end view on line 3b—3b of FIG. 3a, and a top view, respectively, of the sensing portion of my transducer utilizing three pairs of secondary windings; and FIG. 3d illustrates an enlarged perspective view of one of the additional secondary windings shown in FIGS. 3a, 3b and 3c.

Figure 1:
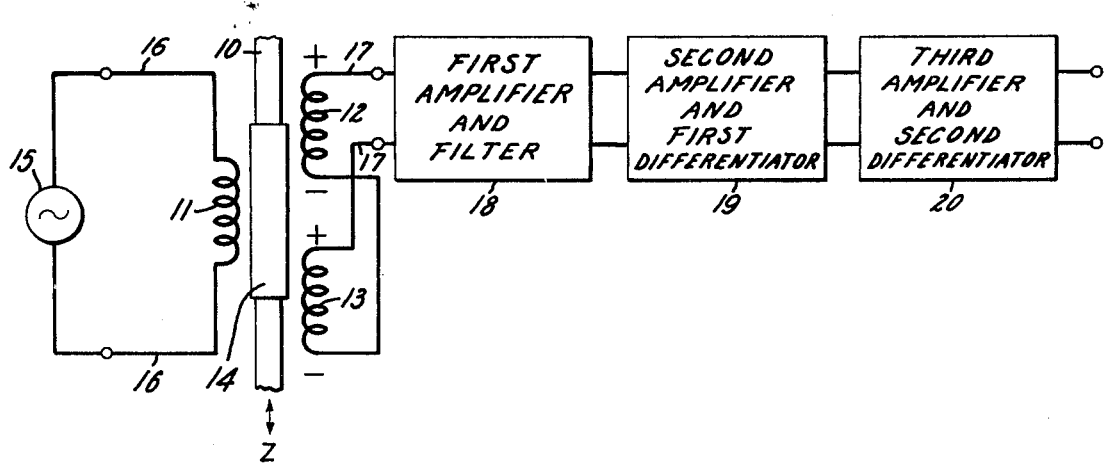
FIG. 1 is a schematic representation of my transducer utilizing one pair of secondary windings.

Referring now in particular to FIG. 1, there is a schematic representation of an embodiment of a vibration transducer constructed in accordance with my invention and adapted for sensing vibration of a rotating shaft 10 along the longitudinal axis illustrated by the arrow heads and letter Z. The sensing portion of my transducer is a differential transformer of special design comprising a primary winding 11, a first secondary winding 12, a second secondary winding 13 and a core 14 fabricated of a high permeability material such as a ferrite. The particular structure and orientation of the various elements of the differential transformer may be more fully appreciated with reference to the elevation view of FIG. 2 which indicates the coils and core in section. Core 14 is of annular form and is rigidly fastened on shaft 10 in any suitable manner such that the core is subject to the same vibration as the shaft. Core 14 should have reasonably uniform permeability to avoid output voltage fluctuations with shaft rotation due to change in coupling between the windings although the embodiment tends to minimize such change by utilizing the entire annular airgap for coupling between windings. The primary and secondary windings are electrically insulated from each other and are each circularly wound about and perpendicular to the longitudinal axis of core 14 and arranged in an annular coil form which is supported stationary relative to the shaft, the annular coil form positioned around core 14 in spaced apart relationship forming a small, substantially uniform air gap therebetween whereby the windings are in flux linkage relationship with the core. As indicated above, each of windings 11, 12 and 13 is wound into rings perpendicular to the axis of core 14 in the form of an annular coil and the primary winding 11 is juxtaposed between the secondary windings 12 and 13. Secondary windings 12 and 13 have equal numbers of turns and are symmetrically disposed on opposite sides of primary winding 11, and the longitudinal dimension of core 14 is such that the core ends extend nearly to the centers of the two secondary windings when shaft 10 is in the null position, (i.e. undergoing no vibration). This particular orientation of the windings with respect to the core in general results in maximum sensitivity, however, it is not a necessary condition to the successful operation of my transducer. The rotating shaft 10 passes completely through the annular coil form, and in the particular illustrated application of my vibration transducer for sensing the longitudinal vibration of a milling cutter machine tool, core 14 is rigidly fastened on the tool shaft 10 near the milling cutter head 21 and the annular coil form is rigidly mounted on a fixed support 22 connected to a stationary part of the machine tool such as the spindle housing. This orientation of the annular coil form and annular core whereby a small air gap is maintained therebetween results in the primary and secondary windings of the differential transformer being mechanically isolated from the rotating shaft 10, and thus not subject to vibration, resulting in reliable operation of the transducer over a long lifetime. Since the differential transformer inherently has high sensitivity to small displacements of the core thereof, and produces a relatively large output signal, and is of relatively simple design, it is well adapted for applications such as a vibration transducer for machine tool control.

An A.C. excitation voltage source 15 has its output impressed across primary winding 11 which causes induced voltages across each secondary winding 12 and 13. The voltage output of carrier frequency source 15 is at a substantially constant amplitude and at a substantially constant frequency which is as high as is compatible with the particular differential transformer design employed since the output voltage developed across the transformer secondary windings, and sensitivity, both increase with frequency. The upper carrier frequency is limited by core losses and coil impedances which increase with frequency. The lower carrier frequency is limited by the reduced sensitivity and vibration frequency bandwidth. As a result of these considerations, a carrier frequency in the range of 10 to 100 kilohertz provides satisfactory operation of my transducer, and is suitable for the particular differential transformer design to be described hereinafter. However, the above cited frequency range is not a limitation on my invention since particular differential transformer designs may result in satisfactory transformer operation outside of such frequency range. A limitation on the selected carrier frequency is that it be at least ten times the highest anticipated vibration frequency to permit ease of filtering out the carrier frequency in the first stage 18 of electronic circuitry associated with secondary windings 12, 13.

A magnetic shield 23 is preferably utilized around the annular coil form to minimize the effect of magnetic field disturbances, particularly when iron bodies are brought near the transducer. Such a shield also minimizes the noise pickup in the pair of electrical conductors 16 which supply the A.C. voltage to primary winding 11 and the pair of conductors 17 which transmit the output A.C. voltage across secondary windings 12, 13 to electronic circuitry associated with the sensor which forms the other component of my vibration transducer. Finally, shield 23 conveniently provides an enclosure for supporting the annular coil form.

The operation of my transducer may be briefly described as follows. The flux linkage in each secondary winding 12 and 13 is dependent on the relative position of the core 14. Thus, in the null position of shaft 10, the secondary windings 12, 13 are positioned symmetrical with respect to core 14, the induced voltage in each secondary winding is equal, and thus the output voltage across the pair of serially-opposed secondary windings is zero. During vibration of shaft 10, and in particular, a longitudinal vibration in the FIGS. 1 and 2 embodiment, core 14 is displaced slightly from the null position on both sides thereof resulting in unequal induced voltages in the secondary windings and a resultant output voltage across conductors 17. This output voltage across conductors 17 is the carrier frequency modulated by the vibration frequency envelope wherein the peak amplitude of the vibration frequency envelope is directly proportional to the amplitude of shaft vibration displacement. The carrier frequency is, of course, constant, whereas the vibration frequency and vibration frequency envelope amplitude are, in general, variable since the shaft vibration is also usually variable. The voltage across conductors 17 is applied to the input terminals of a first amplifier and filter circuit 18. Component 18 is of conventional design and is utilized to amplify the input voltage which appears across conductors 17 and to suppress or filter out the carrier frequency (excitation voltage) and have sufficient bandwidth to pass the vibration frequency range. Further, component 18 may include a phase angle or output balance control if the output voltage across conductors 17 is excessive in the shaft null position. This control can be a simple RC circuit and may alternatively be inserted in the differential transformer primary winding circuit. Finally, component 18 provides a rectifying action utilizing push-pull amplifiers or a single amplifier with suitable blocking diodes. Thus, the output signal of circuit 18 is a direct-current (D.C.) voltage of magnitude directly proportional to the amplitude of shaft displacement from the null point. In the case of shaft 10 vibrating on both sides of its null point, the D.C. voltage is time-variable in magnitude and frequency wherein the magnitude is directly proportional to the amplitude of shaft vibration displacement and the frequency of variation corresponds to the vibration frequency. In the case of shaft 10 merely being displaced to one side of the null point, the D.C. voltage output of circuit 18 is of magnitude directly proportional to the magnitude of the displacement from the null point, and changes in polarity if the shaft is displaced in the opposite direction.

In many adaptive feedback machine tool control systems, a signal representing the velocity and even acceleration of the shaft vibration may be required, and for this reason additional electronic circuitry may be connected to the output of circuit 18 for obtaining the appropriate voltage signals. Thus, the signal at the output of circuit 18 may be further processed by connecting an electronic circuit 19 to the output of circuit 18 wherein circuit 19 includes a second amplfier and a first differentiator circuit of conventional design. The differentiation of the displacement signal existing at the output of circuit 18 provides a shaft vibration velocity D.C. voltage signal at the output of circuit 19. Finally, a third electronic circuit component 20 which includes a third amplifier and a second differentiator circuit is connected to the output of circuit 19 to provide at the output thereof a shaft vibration acceleration D.C. voltage signal wherein the amplitude of the output voltage is directly proportional to the magnitude of the vibration acceleration of shaft 10.

Figure 2:
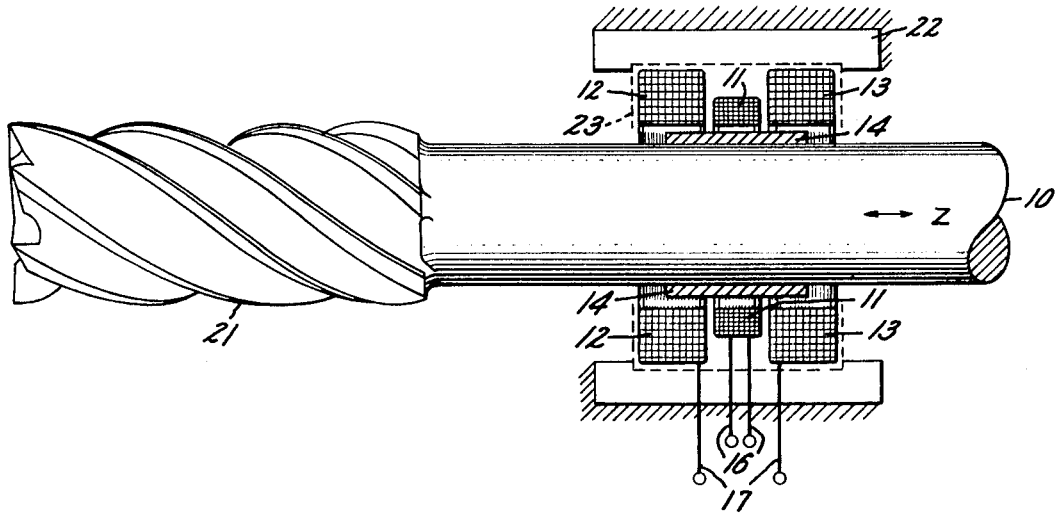
FIG. 2 is an elevation view, partly in section, illustrating the sensing portion of the embodiment of my vibration transducer depicted in FIG. 1.

A specific example of the sensor portion of my vibration transducer corresponding to the FIGS. 1 and 2 embodiment is as follows: Core 14 is fabricated of a ferrite material identified as type MN–31 commercially available from General Precision, Inc. and has a zinc oxide base and a temperature coefficient of expansion which closely matches tool steel. Core 14 has an inner diameter of 1 inch and an outer diameter of 1½ inch and a longitudinal dimension of ⅝ inch. A substantially uniform air gap of 0.020 inch is maintained between the core and coil forms. The primary winding consists of 100 turns, the two secondaries are each of 1200 turns, and the longitudinal dimension of the coil form is 1 inch. Shield 23 is constructed of mu-metal having a thickness of 0.006 inch. Excitation (carrier) frequencies in the range from 10 to 100 kilohertz were utilized and provided useful output signals with adequate signal-to-noise ratio. A resolution or sensitivity for my transducer was obtained whereby displacements of less than 5 microinches were detected over a range of at least 0.005 inch for vibration frequencies ranging up to 3 kilohertz. The magnetic shield prevented distortion of the magnetic field within the transformer from metal parts which were brought as close as one inch from the annular coil form.

A second embodiment of my vibration transducer is illustrated in FIGS. 3a, 3b, 3c and 3d and is adapted for sensing both longitudinal and lateral shaft vibration. For illustrative purposes only, the longitudinal vibration is taken to be along a horizontal axis Z and the lateral vibration in a vertical plane whereby the lateral vibration components are along orthogonal horizontal X and vertical Y axes relative to the longitudinal axis Z. The elevation view of FIG. 3a corresponds to the elevation view of FIG. 2. The sectional end and top views, FIGS. 3b and 3c, respectively, indicate that two additional pairs of secondary windings are utilized to sense the horizontal X and vertical Y components of lateral vibration of shaft 10. Thus, primary 11 and secondary windings 12, 13 are each annular coils as in the case of the FIG. 2 embodiment, and a second pair of secondary windings comprising windings 30 and 31 are located vertically upward and downward of shaft 10, respectively, for sensing the vertical vibration component Y, illustrated by the arrow heads and letter Y in FIG. 3b. In like manner, a third pair of secondary windings 32 and 33 are located horizontally to the left and right of shaft 10, respectively, for sensing the horizontal vibration component X. Each of coils 30, 31 32 and 33 is disposed along an arc of the annular coil form which includes windings 11, 12, 13, 30–33 and is spaced from and parallel to the outer surface of annular core 14 to form a substantially uniform air gap therebetween in the shaft null position. Thus, primary winding 11 and secondary windings 12 and 13 completely encircle core 14 whereas secondary windings 30–33 each occupy an arc of approximately 45° along the circumference of the annular coil form. As illustrated in FIGS. 3a and 3c, each of secondary windings 30–33 is wound about an auxiliary magnetic core 34, 34''', 34', and 34'', respectively, and has a first underside 35 thereof juxtaposed between primary winding 11 and secondary winding 12, and a second underside 36 juxtaposed between the primary winding and secondary winding 13. The oversides of secondary windings 30–33 are in overlapping and crossed-over relationship to the primary winding 11 as illustrated in FIGS. 3c and 3d. Each core 34, 34', 34'', 34''' is preferably disposed on an arc along the circumference of the annular coil form as shown in the side view of FIG. 3b and radially outward of winding 11 and in overlapping relationship to winding 11 and the undersides of winding 30 (or 31–33) along the shaft longitudinal axis as shown in FIGS. 3a and 3c. Winding 30 and core 34 is illustrated in enlarged perspective in FIG. 3d. Thus, each core 34, 34''', 34', 34'' completes the magnetic circuits for the particular associated winding 30, 31, 32, or 33, respectively. Secondary windings 30 and 31 are connected in series-opposed relationship and secondary windings 32 and 33 are also connected in series-opposed relationship in the manner of secondary windings 12 and 13 such that a pair of conductors corresponding to conductors 17 in the FIGS. 1 and 2 embodiment extend from each pair of secondary windings 12, 13 and 30, 31 and 32, 33 to separate first amplifier and filter circuits shown in FIG. 1 for processing the longitudinal Z and X and Y component signals. Additional signal processing may be employed by utilizing additional amplifier and differentiator circuits to obtain vibration velocity and acceleration signals, as desired. Auxiliary cores 34, 34', 34'', 34''' are generally of shorter longitudinal dimension than core 14 as shown in FIG. 3a. A change in the longitudinal dimension or shape of the auxiliary cores changes the sensitivity of the outputs of windings 30–33 and may be desired in some cases to emphasize such X and Y component outputs, or one of them.

From the foregoing description, it can be appreciated that my invention attains the objectives set forth and makes available an improved vibration transducer having a sensing portion, the differential transformer windings, mechanically isolated from the shaft undergoing vibration. This approach eliminates the need for mechanical contact to the rotating shaft and does not require slip rings or active components such as transistors mounted on the shaft. The annular core of the differential transformer is rigidly fastened to the vibrating shaft and when displaced from its null position by shaft vibration, it causes a change in coupling between the primary and secondary windings of the transformer thereby resulting in an output voltage across the secondary winding. Vibration frequency component output voltage signals are obtained for vibration along the longitudinal axis of the shaft by utilizing one pair of secondary windings, and lateral shaft vibration is sensed by employing two additional pairs of secondary windings and auxiliary cores to obtain output signals directly proportional to the shaft displacement from null along each of two perpendicular axes in the lateral plane.

Having described two specific embodiments of my vibration transducer, my invention is defined by the following claims.

What I claim as new and desire to secure by Letters Patent of the United States is:

1. A vibration transducer for sensing the vibration of a rotating shaft and the like comprising:
   (a) a differential transformer including:
      (1) an annular core fabricated from a high permeability material and rigidly fastened on the rotatable shaft,
      (2) a primary winding,
      (3) secondary winding means further comprising:
         (i) a first secondary winding,
         (ii) a second secondary winding,
         (iii) said primary and said first and second secondary windings being juxtaposed annular coils arranged in an annular coil form positioned around and stationary relative to the rotatable shaft at the shaft section to which said annular core is rigidly fastened, said first and second secondary windings having equal numbers of turns and being symmetrically positioned on opposite sides of said primary winding.
         (iv) a third secondary winding having a first underside thereof juxtaposed between said primary and said first secondary windings and a second underside juxtaposed between said primary and said second secondary windings, said third secondary winding being wound on a first auxiliary magnetic core and having the oversides in overlapping and crossed-over relationship to said primary winding, said third secondary winding arranged in a coil form disposed vertically upward of the shaft,
         (v) a fourth secondary winding having a first underside thereof juxtaposed between said primary and said first secondary windings and a second underside juxtaposed between said primary and said second secondary windings, said fourth secondary winding being wound on a second auxiliary magnetic core and having the oversides in overlapping and crossed-over relationship to said primary winding, said fourth secondary winding arranged in a coil form disposed vertically downward of the shaft, (b) means for applying an alternating-current excitation voltage at a substantially constant high frequency and constant amplitude across said primary winding, and (c) means in communication with said secondary winding means for developing voltage signals of magnitudes proportional to characteristics of shaft vibration and of frequencies corresponding to the frequencies of shaft vibration along vertical and longitudinal axes, said shaft vibration frequencies being lower than the frequency of the excitation voltage applied across said primary winding.

2. The vibration transducer set forth in claim 1 wherein said secondary winding means further comprises:

a fifth secondary winding having a first underside thereof juxtaposed between said primary and first secondary windings and a second underside juxtaposed between said primary and second secondary windings, said fifth secondary winding wound on a third auxiliary magnetic core and having the oversides in overlapping and crossed-over relationship to said primary winding, said fifth secondary winding arranged in a coil form disposed horizontally to the left of the shaft, a sixth secondary winding having a first underside thereof juxtaposed between said primary and first secondary windings and a second underside juxtaposed between said primary and second secondary windings, said sixth secondary winding wound on a fourth auxiliary magnetic core and having the oversides in overlapping and crossed-over relationship to said primary winding, said sixth secondary winding arranged in a coil form disposed horizontally to the right of the shaft, and means in communication with said fifth and sixth secondary windings for developing a voltage signal of magnitude proportional to a characteristic of the shaft vibration along a horizontal axis which is orthogonal to the vertical and longitudinal axes.

3. The vibration transducer set forth in claim 2 wherein:

said first and second secondary windings are connected in series-opposed relationship, said third and fourth secondary windings are connected in series-opposed relationship, and said fifth and sixth secondary windings are connected in series-opposed relationship whereby the developed voltage signals are zero in the case of the shaft undergoing no vibration.

4. A vibration transducer for sensing the vibration of a shaft and the like comprising:

(a) a differential transformer including:

(1) a core member fabricated from a high permeability material and rigidly fastened on the shaft, (2) a primary winding, (3) a first pair of secondary windings arranged on opposite sides of said primary winding along the longitudinal axis of the shaft, the winding of said first pair being connected to one another in series opposition and being inductively coupled to said primary winding through said core member, (4) a second pair of secondary windings arranged on opposite sides of the shaft on a first diametral axis therethrough adjacent said primary winding, the windings of said second pair being connected to one another in series opposition and being inductively coupled to said primary winding through said core member;

(b) means for applying an alternating-current excitation voltage at a substantially constant high frequency and constant amplitude across said primary winding; and (c) means connected to said secondary windings for developing signals having magnitudes proportional to the magnitudes of shaft displacement along the longitudinal and first diametral axis respectively and frequencies proportional to the frequency of shaft vibration along the longitudinal and the first diametral axes respectively.

5. A vibration transducer as recited in claim 4 further including:

(a) a third pair of secondary windings arranged on opposite sides of the shaft on a second diametral axis perpendicular to the first diametral axis adjacent said primary winding, the windings of said third pair being connected in series opposition and being inductively coupled to said primary winding through said core member; and (b) means connected to said third pair of secondary windings for developing a signal having a magnitude proportional to the magnitude of shaft displacement along the second diametral axis and a frequency proportional to the frequency of the shaft vibration along the second diametral axis.

References Cited

UNITED STATES PATENTS 2,853,667   9/1958   Booth _____ 73—71.6 UX
3,147,574   9/1964   La Pointe _____ 324—34 POS RICHARD C. QUEISSER, Primary Examiner C. E. SNEE III, Assistant Examiner U.S. Cl. X.R.

336—130, 136

UNITED STATES PATENT OFFICE
CERTIFICATE OF CORRECTION

Patent No. 3,610,029　　　　　　　　Dated October 5, 1971

Inventor(s) Gerald J. Carlson

It is certified that error appears in the above-identified patent and that said Letters Patent are hereby corrected as shown below:

Column 8, under line 49, insert

| | | | |
|---|---|---|---|
| 2,204,425 | 6/11/40  | Mershon   | 73-71.4   |
| 2,305,268 | 12/15/42 | Minor     | 73-70.1X  |
| 2,469,137 | 5/3/49   | Strong    | 73-71.2X  |
| 2,864,997 | 12/16/58 | von Basel | 73-71.4X  |
| 3,128,441 | 4/7/64   | Johnson   | 336-136X  |

Signed and sealed this 10th day of October 1972.

(SEAL)
Attest:

EDWARD M. FLETCHER, JR.　　　　　　　　ROBERT GOTTSCHALK
Attesting Officer　　　　　　　　　　　Commissioner of Patents